Oct. 1, 1929. J. ADAMS Re. 17,446

BRUSH

Original Filed March 12, 1926

Inventor:
Joseph Adams,
by Walter E. Lombard,
Atty.

Reissued Oct. 1, 1929 Re. 17,446

UNITED STATES PATENT OFFICE

JOSEPH ADAMS, OF BOSTON, MASSACHUSETTS, ASSIGNOR TO ADAMS-WHITE BRUSH CO., OF BOSTON, MASSACHUSETTS, A CORPORATION OF MASSACHUSETTS

BRUSH

Original No. 1,618,742, dated February 22, 1927, Serial No. 94,348, filed March 12, 1926. Application for reissue filed November 9, 1928. Serial No. 318,290.

This invention relates to brushes and is herein illustrated as applied particularly to devices of this character adapted to be secured to a stationary member while the articles to be operated upon are moved beneath the projecting bristles thereof, the object of the invention being the production of a brush in which the bristles may be renewed as desired.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a horizontal section of a brush embodying the principles of the present invention, the cutting plane being on line 1, 1, on Fig. 2.

Figure 1[a] shows a fragment of a brush similar to that seen in Figure 1, only with the brush-holding units arranged in staggered relation.

Similar characters indicate like parts throughout the several figures of the drawings.

Figure 1:
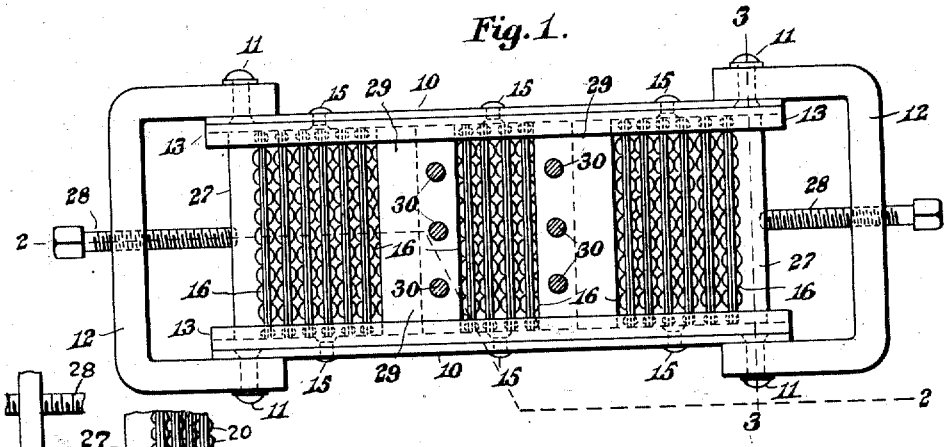
Figure 1A:
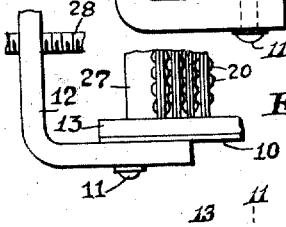
Figure 2:
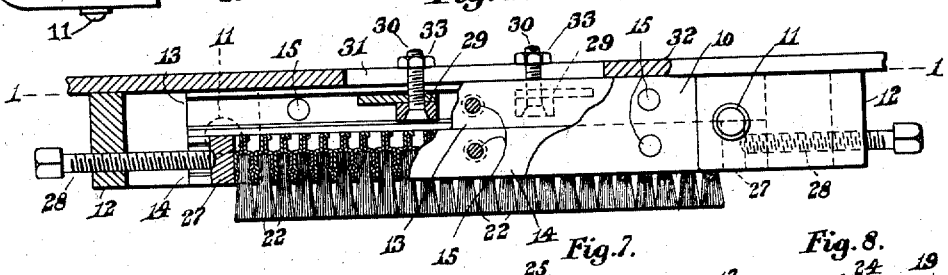
Figure 2 represents a longitudinal vertical section of same on line 2, 2 on Fig. 1.
Figure 3:
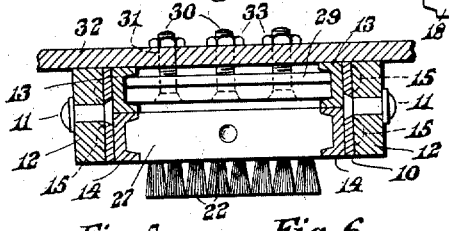
Figure 3 represents a transverse vertical section of same on line 3, 3, on Figure 1.
Figure 7:
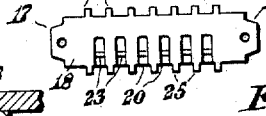
Figure 7 represents an elevation of one of the plates forming the bristle-supporting unit and showing the inner face thereof.
Figure 8:
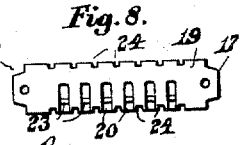
Figure 8 represents an elevation of the other plate forming the bristle-supporting unit and showing the inner face thereof.
Figure 4:
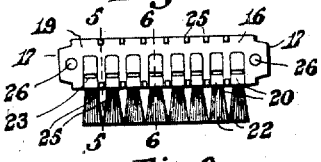
Figure 4 represents a front elevation of one of the bristle-supporting units.

In the drawings, 10, 10 are the side members of a frame having pivoted, at 11, to the ends thereof, the U-shaped connecting members 12.

Each side member consists of a plate 10 having disposed on the inner face thereof two channel bars 13 and 14, secured to the plate 10 by rivets 15.

These channel bars 13 and 14 form oppositely disposed grooves in which are disposed a plurality of bristle-supporting units 16 having projections 17 at the opposite ends thereof extending into said grooves.

Figure 5:
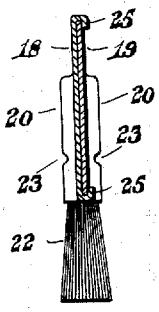
Figure 5 represents a vertical section of said unit on line 5, 5 on Figure 4 and drawn to an enlarged scale.
Figure 6:
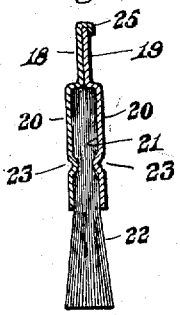
Figure 6 represents a vertical section of said unit on line 6, 6 on Fig. 4, and also drawn to an enlarged scale.
Figure 9:
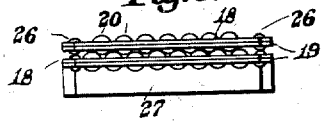
Figure 9 represents a plan of two bristle-supporting units with their corrugations staggered and showing one of the grooved clamping plates coacting with the outer unit.

Each bristle-supporting unit 16 is composed of two plates 18 and 19, the upper ends of which are flat and in contact, as shown in Figs. 5 and 6, while the lower portions thereof have corrugations 20 formed therein.

These corrugations are oppositely disposed in pairs forming sockets 21 in which a plurality of bristles 22 are positioned.

The bristles 22 extend to the inner end of each socket 21 and by this end are prevented from moving inwardly.

Each corrugation has an indentation or crease 23 formed therein which extends inwardly into the socket 21 and impinges upon the bristles 22, thereby preventing any outward movement of said bristles.

The plate 19 has a plurality of notches 24 in the opposite edges thereof, and the plate 18 has at its opposite edges projecting clips 25 which are adapted to be bent over the plate 19 and positioned in the notches 24.

The plates 18 and 19 are also secured together by rivets 26 in the opposite ends of said plates.

The bristle-supporting units 16 are adapted to be inserted in the grooves of the channel bar 14 in any desired number, and at the opposite ends of the series of units 16 are disposed clamping bars 27, the inner faces of which are corrugated to fit the corrugations in the bristle-supporting units 16.

When the series of units 16 is thus disposed within the grooves of the channel bars 14 and the clamping plates 27 are disposed at the opposite ends thereof, all of the units are forced toward each other and clamped by means of an adjusting screw 28, threaded to each U-shaped connector 12.

Should the bristles of any of the units become unduly worn the U-shaped connecting members 12 may be moved about their pivots 11 and the bristle-supporting units 16 removed and new ones inserted to replace those which have become unduly worn.

In the grooves in the upper channel bar 13 are disposed cross bars 29 having bolts 30 extending upwardly therefrom through slots 31 in a stationary part 32 of a machine, the upper ends of the bolt 30 having threaded thereto clamping nuts 33.

These bars 29 may be adjusted endwise of the channel bars 13 and then clamped to the stationary part 32 in any desired position.

The stationary part 32 is some portion of the frame of a machine disposed over a reciprocating table on which is mounted the article to be acted upon by the projecting bristles 22 of the various units 16.

One use of the brush is in connection with a paper coating machine in which coloring matter is applied to one face of a roll of paper by rotary brushes, the paper then passing over a bed and under a plurality of brushes of the type herein shown and described, these brushes being reciprocated over the coated face of the paper in different directions and spreading the coloring matter evenly over the entire face.

As the machine itself forms no part of the present invention, it is deemed unnecessary to illustrate the same in detail.

While in Fig. 1 the corrugations of the various units 16 are shown alined, if desired these corrugations may be staggered, as shown in Figs. 1[a] and 9, so that the bristles in one unit will be opposite the spaces between the group of bristles in the next unit. When the corrugations are thus staggered, with their backs intermeshed, as shown in Figs. 1[a] and 9, the compressing together of the units, as by the clamping plates 27, combines them all into a single larger brush, in which the units 16 are securely and rigidly interlocked with each other for any use or manner of operation of the brush as a whole that may be desired.

Owing to the projections 17 extending into the grooves of the channel bars 14, there can be no vertical movement of the various units, and owing to the clamping screw 28, all movement of these units endwise of the frame 10, 12, is effectually prevented.

At the same time, when it is desired to replace the worn bristle-supporting units 16 by others, this can be readily accomplished in an obvious manner.

This makes a very simple form of brush for heavy machines providing means whereby it may be securely clamped in position to a stationary part of the frame.

It is believed that the operation and many advantages of the invention will be understood without further description.

Having thus described my invention, I claim:

1. A brush consisting of a frame having parallel side members with oppositely disposed grooves therein, a plurality of bristle-supporting units the ends of which are disposed in said grooves, a member pivoted to one end of said frame, and an adjusting screw carried by said pivoted member and adapted to clamp said units together.

2. A brush consisting of a frame having parallel side members with oppositely disposed grooves therein, a plurality of bristle-supporting units the ends of which are disposed in said grooves, a U-shaped member pivoted to one end of said frame, and an adjusting screw carried by said pivoted member and adapted to clamp said units together.

3. A brush consisting of a frame having parallel side members each having two grooves extending lengthwise thereof, a plurality of bristle-supporting units clamped together in the lower grooves, and adjustable members in the upper grooves having means for securing said frame to a stationary member.

4. A brush consisting of a frame having parallel side members each having two grooves extending lengthwise thereof, a plurality of bristle-supporting units clamped together in the lower grooves, plates in the upper grooves movable endwise of the frame, bolts extending upwardly therefrom through slots in a stationary member, and clamping nuts threaded to the upper ends of said bolts.

5. A brush consisting of a frame having parallel side members with oppositely disposed grooves therein, a plurality of bristle-supporting units the ends of which are disposed in said grooves, each unit consisting of two plates with bristles clamped between them, clamping bars at the opposite ends of the series of units with the opposite ends thereof disposed in said grooves, and an adjustable member at one end of the frame coacting with one of said bars for clamping said units together.

6. A brush consisting of a frame having parallel side members with oppositely disposed grooves therein, a plurality of bristle-supporting units the ends of which are disposed in said grooves and the opposite faces of which are corrugated, clamping bars at the opposite ends of the series of units, and an adjustable member at one end of the frame coacting with one of said bars for clamping said units together, said bar on its inner face having depressions to receive the corrugations in the outer face of an end unit.

7. A brush consisting of a frame composed of grooved side members having U-shaped connecting members pivoted to the ends thereof, a plurality of bristle-supporting units with their ends disposed in the grooves of said side members, and means carried by said connecting members for clamping said units together.

8. In a brush, a bristle-supporting unit complete in itself composed of two thin bent plates having oppositely disposed corrugations therein, bristles disposed in the recess formed by each pair of corrugations and extending therefrom, and means interposed between the clusters of bristles for locking the two plates together.

9. In a brush, a bristle-supporting unit composed of two plates having oppositely disposed corrugations therein, bristles disposed in the recess formed by each pair of corrugations and extending therefrom, means interposed between the clusters of bristles for locking the two plates together consisting of clips formed upon one plate and bent over the edge of the other plate and indentations extending transversely of said corrugations and adapted to clamp said bristles.

10. In a brush, a bristle-supporting unit complete in itself and composed of two thin bent plates having oppositely disposed corrugations therein, bristles disposed in the recess formed by each pair of corrugations and extending therefrom, means at the opposite edges of said plates for locking said plates together, said means being integral with said plates and means on said plates preventing end movement of the bristles.

11. In a brush, a series of bristle supporting units each comprising, in combination, a pair of plates, each said plate having corrugations along an edge, forming depressions from the face and ridges on the back of the plate; the depressions of each plate of the pair being in register with and opening toward the depressions of the other plate of the pair to form recesses; the said faces of a pair being in contact, and the ridges of adjoining pairs interlocking; bristles secured in said recesses; and means to hold the whole series of units in said interlocked relation.

12. A brush comprising, in combination, plates each having corrugations along an edge, forming depressions on one side and ridges on the other side of the plate; said plates being arranged in pairs comprising units with the depressions of one of the pair in register with and opening toward the depressions of the other, forming recesses; the said units being disposed in parallelism in a series with the ridges of one unit interposed between and interlocked with the ridges of its next adjacent unit; corrugated holders at the opposite ends of the series engaging the corrugations in the end units; and bristles in said recesses.

13. A brush comprising a plurality of units each composed of a pair of plates, each plate having corrugations along its edge, the plates of the pair being faced together with their corrugations registering together, the depression thereof making recesses at the edge of the unit and the crests thereof contacting together and thus separating the recesses; and tufts of bristles in the recesses; adjacent units being arranged with the backs of corrugations of one unit intermeshing with those of the adjacent unit, the units being thus interlocked with their tufts in staggered relation.

14. A brush comprising a plurality of units each composed of a pair of plates, each plate having corrugations along its edge, the plates of the pair being faced together with their corrugations registering together, the depressions thereof making recesses at the edge of the unit and the crests thereof contacting together and thus separating the recesses; and tufts of bristles in the recesses; adjacent units being arranged with the backs of corrugations of one unit intermeshing with those of the adjacent unit, the units being thus interlocking with their tufts in staggered relation; and there being clamping plates compressing the units together in said intermeshing relation.

15. In a brush, a multiplicity of corrugated plates, disposed in succession and alternately facing oppositely; successive plates which face together having the depressions of their corrugations oppositely disposed making recesses, having their crests oppositely disposed, separating the recesses; and successive plates which back together having the protuberant backs of their several said depressions intermeshing; bristles supported in the recesses; and means maintaining the said intermehsed relation of backs.

16. In a brush, a multiplicity of bent, thin plates, disposed in succession and alternately facing oppositely; the said plates each having a plane body portion in whose face a row of separated depressions is formed at the edge of the plate, with corresponding protuberances in the back of the plate; the plates of a pair which face together having their depressions registering together, forming edge recesses; bristles supported in the recesses; the plates of a pair which back together having their said protuberances intermeshing; and means maintaining the whole said succession compressed together.

17. In a brush, a multiplicity of bristle supporting units each comprising a pair of plates; each said plate of a pair having means on one side adapted to co-operate with similar means on the other plate of the pair to form bristle-holding recesses; and having means on its opposite side adapted to engage a plate of another unit whereby said units when pressed together constitute a single whole; bristles in said recesses, and means pressing said units together.

18. In a brush, the combination of a multiplicity of bristle-supporting units arranged in parallel along the longitudinal axis of the brush; each unit comprising means, on both sides thereof, adapted to engage its adjoining units in intermeshed relation when the units are pressed together along the said axis; and means at the ends of the brush holding the units thus pressed.

19. In a brush, the combination of a multiplicity of bristle-supporting units arranged in parallel along the longitudinal axis of the brush; the side of each unit having corrugations adapted to intermesh with similar corrugations of adjoining units; and means holding said units with their corrugations in intermeshing relation.

Signed at Boston, Massachusetts, this seventh day of November, 1928.

JOSEPH ADAMS.